March 27, 1956     R. V. YOUNG, JR     2,740,035
HEATING DEVICE
Filed July 6, 1953
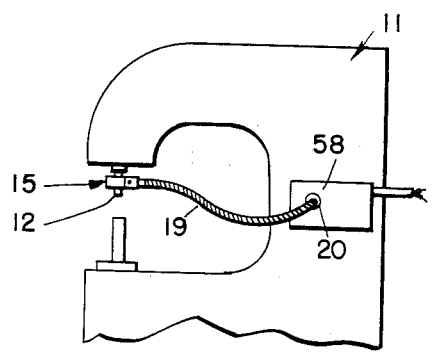
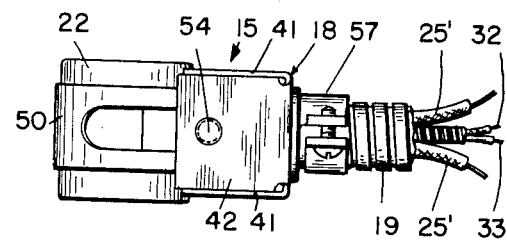
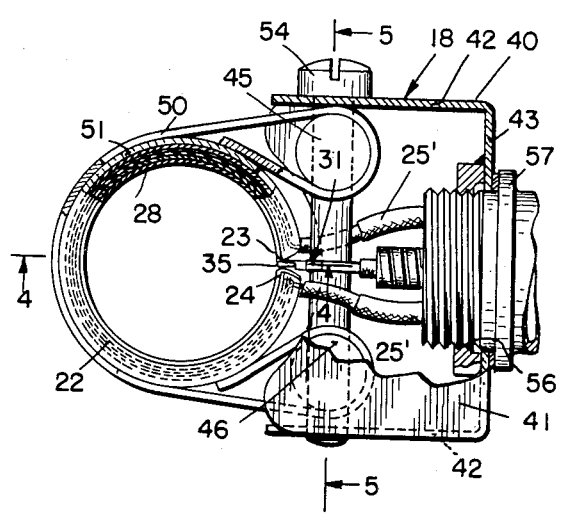
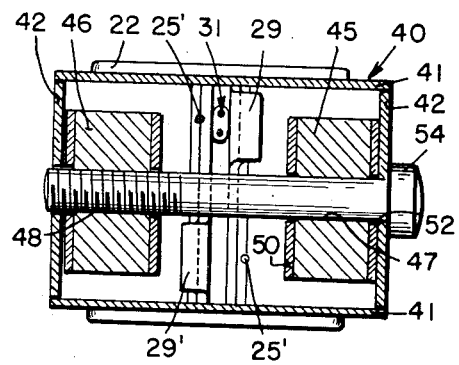
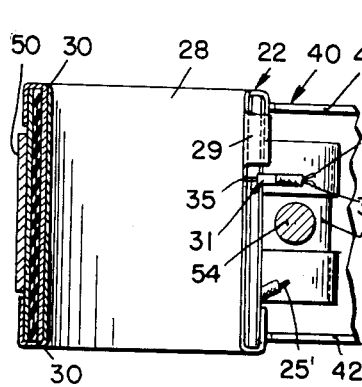
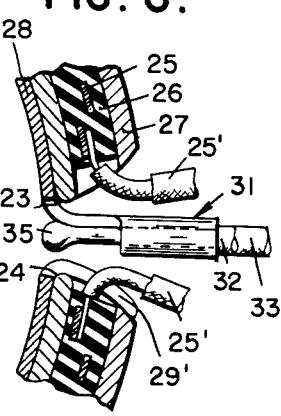
INVENTOR
ROY VAN YOUNG JR.
BY
Mason & Graham
ATTORNEYS

United States Patent Office 2,740,035
Patented Mar. 27, 1956

2,740,035

HEATING DEVICE

Roy Van Young, Jr., Los Angeles, Calif., assignor to Zephyr Manufacturing Company, Manufacturing Division, a corporation of California Application July 6, 1953, Serial No. 366,278

3 Claims. (Cl. 219—19)

This invention has to do with electrical devices for heating tool parts of machines used in metal forming.

Parts of certain metal forming tools are required to be heated and maintained at a given temperature during use thereof, such, for example, as the dies in tools used for forming dimples around openings in metal sheets.

In devices with which I am familiar, the heating device is attached directly to the tool, such as the die, the latter being received in a bore in the heating device. Such heating devices employ a heating cartridge of the resistance wire type and in one form of device the cartridge extends radially of the tool, while in another form the heating cartridge is mounted in a block of metal so as to lie substantially tangential to but somewhat spaced from the tool or die part. In both of these known devices, the heat transfer is relatively inefficient, being both slow and unequal with respect to the near and far portions of the tool. Furthermore, such devices are somewhat bulky and, under certain operating conditions where clearance is at a minimum between the various working parts, the heating device often interferes with proper operation of the tool and the device is often damaged. Consequently, these devices have a relatively short life. Another disadvantage of known devices is the fact that they do not efficiently clamp or mount upon the tool and it is difficult to remove a heating device from one die and install it on another.

Heating devices of the type indicated must ordinarily be controlled to within a few degrees of the heat desired and for this purpose are customarily fitted with a thermocouple. The thermocouple is usually so mounted in the heating device as to more accurately indicate the temperature of the heating device itself rather than the die or other member on which it is mounted, and consequently it frequently happens that the tool is not maintained at proper temperature.

An object of my invention is to provide a novel, improved heating device of the type indicated designed particularly for metal forming tools, such as dies used in dimpling metal sheets but having other uses, which does not have the above noted disadvantages of heating devices presently and heretofore used.

Another object is to provide a heating device which is so constructed as to result in good heat transfer or conduction from the heating element thereof to the tool upon which it is mounted and, in this connection, it is an object to provide a device wherein the heating element surrounds the tool in proximity thereto.

A further object is to provide a heating device in which means is provided for efficiently clamping or securing the device around the tool element.

Still another object is to provide a heating device embodying thermocouple means which is so placed and related to the other elements of the device as to give a true indication of the actual temperature of the tool itself.

A further object is to provide a heating device which is relatively small and so designed as to present no problem where clearances between the working parts of the machine with which it is used are at a minimum.

Another object is to provide a device of the type indicated which is easy to assemble, disassemble and to service.

Still a further object is to provide a heating device which can readily be detached from a tool and mounted on another.

These and other objects will be apparent from the drawings and the following description.

Referring to the drawings:

Fig. 1 is an elevational view of a device embodying the invention shown mounted on a tool element of a machine which is fragmentarily shown;

Fig. 2 is a side elevational view of the device of Fig. 1 but on a larger scale;

Fig. 3 is a plan view partly broken away on a larger scale;

Fig. 4 is a sectional view on line 4—4 of Fig. 3;

Fig. 5 is a sectional view on line 5—5 of Fig. 3; and

Fig. 6 is a fragmentary, enlarged, sectional plan view of the juncture of the thermocouple and the conductor sleeve.

More particularly describing the invention, in Fig. 1 I show a machine 11, which may be a punch press or the like, having a die or tool element 12 mounted thereon and, surrounding this and secured thereto, is a heating device 15 embodying the invention.

The device 15 comprises generally, a head 18, a flexible conduit 19, and an electrical connector 20 at the other end of the conduit. The heating device includes a heating element or cartridge 22 which is substantially annular in shape, being split or divided axially, terminating in edges 23 and 24 which define the split. This heating element is of the resistance wire type and embodies resistance wire 25 within insulation 26 and a casing 27 with a pair of lead wires 25′. The latter extend through conduit 19 to the appropriate terminals in the connector 20.

In the heating element I provide a split heat conductor sleeve 28. This is preferably made of coin silver to preclude oxidation under heat which would interfere with good heat transfer. This conductor sleeve fits closely within the heater element and is provided with ears 29 and 29′ at its edges, which are bent back upon themselves over the edges 23 and 24 of the heating element respectively. Also, the ends of the sleeve 28 are flared outwardly at 30 partially over the ends of the heating element.

A particular feature of the invention is the provision of a heating device wherein it is possible to utilize a thermocouple in a manner such as to obtain a true indication of the heat of the tool on which the device is mounted. This is accomplished by providing a thermocouple assembly 31 which consists of wires 32 and 33 in a conduit 34. The wires terminate or are joined in the usual bead 35. This bead is positioned in the split or space between the edges of the conductor sleeve and is clamped to the conductor ring by a tubular extension 38 thereon which clamps about the thermocouple wires. The die or tool is received within the conductor sleeve and it will be apparent, therefore, that the thermocouple bead is so located as to give an accurate indication of the temperature of the tool.

In order to mount the heater element and conductor sleeve about a die or the like and in firm engagement therewith, I provide a housing 40 having side walls 41, apertured end walls 42 and a base wall 43. Within the housing I mount a clamp assembly which includes posts 45 and 46. Post 45 has a hole 47 therethrough and the other post has a correspondingly positioned hole 48, the latter being threaded. An outer band 50 encircles the posts and is attached at its ends as by welding or the like, to the ends of an inner band 51 which encircles the heating element. The posts are received within the housing 40 so that the openings therein are in registration with openings 52 in the end walls of the housing, and a screw 54 is used for tightening the clamping member about the heating element and thereby clamping the entire assembly about the desired tool.

The housing has a threaded opening 56 in its base wall 43 to receive a clamp 57 by means of which the end of the flexible conduit 19 is detachably secured to the housing.

In the use of my device, the head 18 is slipped over a die or tool element 12 and the screw 54 tightened to draw the clamp tight about the heating cartridge 22, thereby securing the entire assembly to the tool element 12. The connector 20 is plugged into the appropriate socket of an electrical control panel 58 on the machine 11 and the device is then ready for use. The device is readily removed from the tool by loosening the clamp assembly. It will be apparent that my device provides a heating element substantially completely surrounding the tool and spaced therefrom only by the thickness of a thin sleeve of highly heat conductive metal. In consequence the device is extremely efficient. Also, it will be apparent that the thermocouple bead is positioned right at the periphery of the tool with the result that the thermocouple gives a true indication of the heat of the tool itself.

Although I have illustrated and described a preferred form of my invention, I contemplate that various changes and modifications can be made without departing from the invention, the scope of which is indicated by the following claims.

I claim:

1. In a heating device, a housing having an apertured base for attachment to an electrical conduit, said housing having a pair of laterally spaced end walls, each end wall having an opening in registration with the opening in the other end wall, a clamp band assembly projecting from said housing and including a pair of spaced, apertured screw-receiving members within said housing, said screw-receiving members having aligned openings in alignment with the openings in said housing end walls, the opening in one of said members being threaded, a screw received in the openings in said housing end walls and in said openings in said members, and a split, annular electrical heating cartridge within said clamping assembly outwardly of said housing for receiving a tool, the split portion of said cartridge being adjacent the housing.

2. In a heating device for a tool, a split, annular electrical heating cartridge adapted to surround the tool, a separate split heat conductor sleeve mounted within said cartridge, the split portions of said cartridge and said sleeve being in registration and defining a space, means on an end of said sleeve for anchoring a thermocouple means including a pair of conductors joined at one end with said joined end positioned in said space, a housing at the side of said cartridge adjacent said split, and clamping means mounted in said housing and including a band encircling said cartridge between two points thereon spaced circumferentially from said split.

3. In a heating device for a tool, a split, annular electrical heating cartridge adapted to surround the tool, a split heat conductor sleeve within said cartridge, the split portions of said cartridge and said sleeve being in registration and defining a space, said sleeve and said cartridge having interengaging portions mechanically locking said sleeve and cartridge against relative movement, said sleeve having an end portion formed to provide a clamp for receiving and holding a thermocouple means including a pair of conductors joined at one end with said joined end positioned in said space, a housing at the side of said cartridge adjacent said split, and clamping means mounted in said housing and including a part encircling said cartridge.

References Cited in the file of this patent

UNITED STATES PATENTS

| 1,418,496 | Van Dyke | June 6, 1922 |
| 2,022,662 | Geyser | Dec. 3, 1935 |
| 2,452,214 | Vogel et al. | Oct. 26, 1948 |
| 2,456,142 | Osterheld | Dec. 14, 1948 |
| 2,477,341 | Malmendier | July 26, 1949 |
| 2,545,653 | Desloge | Mar. 20, 1951 |